F. M. ASHLEY.
TRUCK.
APPLICATION FILED JULY 30, 1909.
957,136.
Patented May 3, 1910.
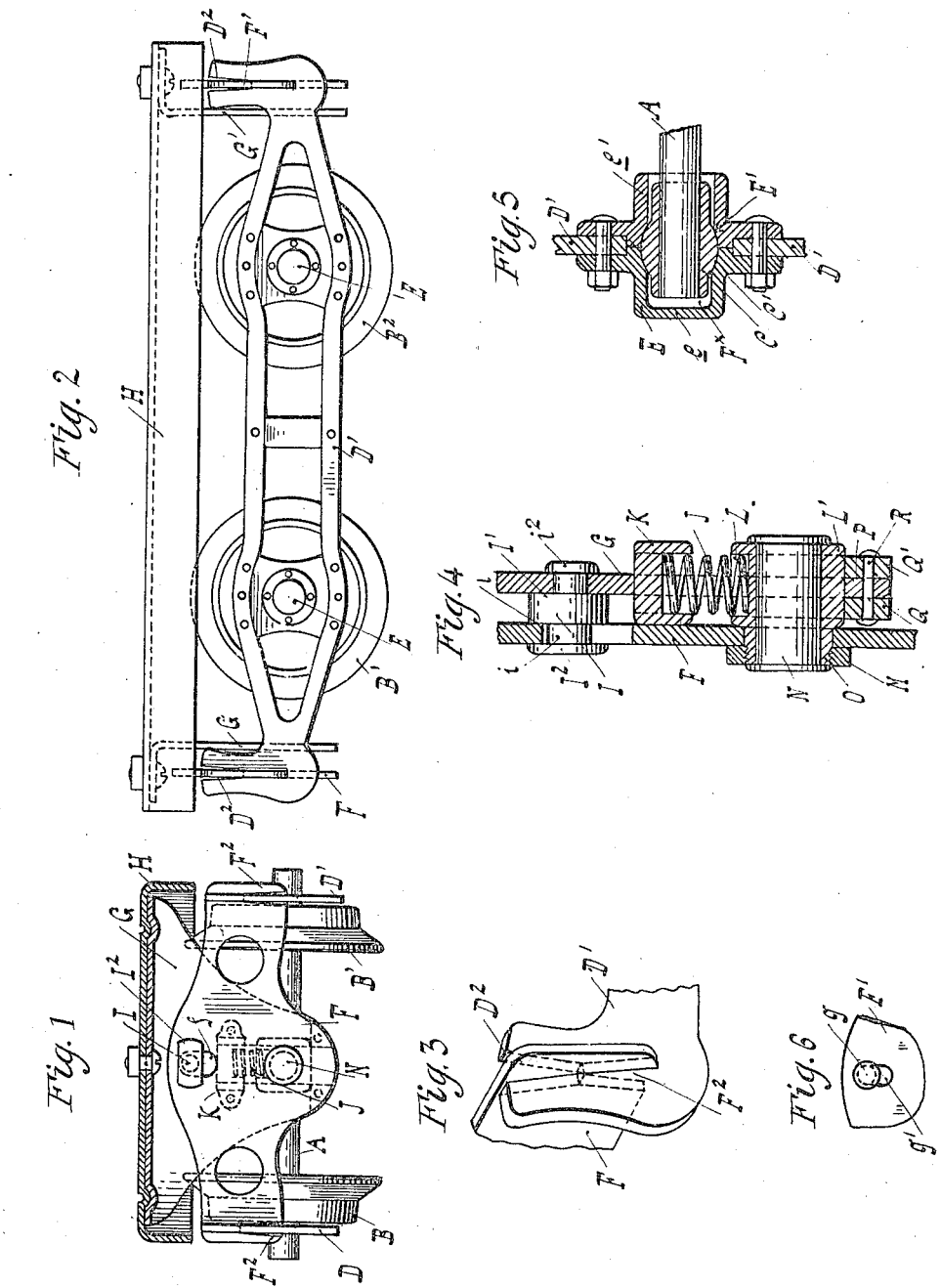

UNITED STATES PATENT OFFICE.

FRANK M. ASHLEY, OF NEW YORK, N. Y.

TRUCK.

957,136.

Specification of Letters Patent.   Patented May 3, 1910.

Application filed July 30, 1909. Serial No. 510,358.

*To all whom it may concern:*

Be it known that I, FRANK M. ASHLEY, a citizen of the United States, and a resident of New York city, in the county of Kings and State of New York, have invented certain new and useful Improvements in Trucks, of which the following is a specification.

My invention relates to car or vehicle trucks and has for its object a truck embodying interchangeable parts.

Another object is to provide a truck having a minimum number of springs, said springs being located at points where they will most effectively carry the loads.

A further object is a construction of the general character referred to, in which the car body or platform may be freely lifted from engagement with the running gear.

Other improved features will be pointed out in the specification and set forth in the claims.

Referring to the drawings,—Figure 1, is a front end view of my improved truck with the platform and flange of the bracket shown in cross section. Fig. 2, is a side view of my truck. Fig. 3, is a detail perspective view of one of the frame connections. Fig. 4, is an enlarged vertical longitudinal sectional view through the platform frame and cross frame, disclosing one of the springs and means for holding same. Fig. 5, is a cross sectional view through one of the truck boxes and bearings. Fig. 6, is a detail view illustrating the means used for holding the rear platform frame and cross frame from swinging relative to each other.

The truck is provided with two axles A, on which are mounted wheels B, B', B², etc. The ends of the axles extend beyond the wheels on each side and are seated in boxes $c$, which boxes are each provided with a spherical surface C' and have extended ends to increase the bearing surface for the axles.

D and D' are side frames, preferably pressed from sheet metal.

E indicates housings comprising two parts $e$ and $e'$ connected to the frames D and D' respectively, by bolts or other suitable means, and provided with an annular recess E', in which the part C' is adapted to fit in such a manner as to be movable to a pre-determined degree. A chamber F$^\times$ is formed in one end of each housing which serves to hold a lubricant.

The side frames D and D' are alike and interchangeable and are provided with slots D², which are adapted to receive the ends of the cross frames F and F', each of which is provided with slots F², which may be V shaped as shown or may be of even width when the ball bearing boxes C are used, but if the truck is equipped with the boxes without the ball bearing feature, it will then be necessary to provide the V shaped slots in order that the side frames may tilt independently of the platform, in case one or more of the wheels should be lifted relative to the others.

The cross frame F is connected to the bracket G in swinging relation thereto and is also movable vertically relative thereto for a limited distance. The cross frame F' and bracket G' are also connected together and are movable vertically relative to each other, but are not connected together in swinging relation.

In Fig. 6, F' indicates a portion of the cross frame and $g$, a bolt which passes through a slot $g'$ and is free to move vertically therein but not laterally, the dotted line indicating the diameter of the bolt and the full line the bolt head, the opposite end of the bolt $g$ being secured in the bracket G'.

In Figs. 1 and 4, I illustrate the means employed for securing a yielding movement between the platform H and cross frames F and F', and for securing the frames G and G' to the cross-frames F and F' respectively.

As before stated, the two ends of the truck are alike except for the single exception that one cross frame is free to swing relative to its bracket whereas the other is not. The front end of the truck has the bracket F, which is provided with a hole $f$ through which one end of a stud bolt I projects, the neck $i$, of which is of less diameter than the width of the hole $f$, and the intervening space thus provided serves to allow the frame F to swing relative to the bracket G for a predetermined distance and also permits the frames to move vertically relative to each other.

The stud bolt I is of comparatively large diameter at its middle portion to provide shoulders $i'$ and $I'$ respectively, the shoulder $i$ and bolt head $I^2$ forming a guide between them to prevent the cross frame and bracket from separating. The end $i^2$ of the stud bolt I is riveted firmly to the bracket G and directly below this point is located a spring J, the upper end of which is seated in an inverted cup-shaped box K, provided with a projection having a slot on each side into which the edges of the bracket G project, and if desired, the box K may also be provided with a flange at each side through which rivets may be passed to further secure it to the bracket G, as indicated by dotted lines in Fig. 1.

The lower end of the spring J is seated in a cup-shaped box L, formed in the top of the casting L', which casting is mounted on a stud bolt N, the surface of which serves as a bearing for the support of the platform H and suspended parts.

The stud bolt N, is secured to the cross frame F by a nut M, and in order to get a longer bearing surface at the point of support, I use a ring O and flange the ends of the stud bolt N, to hold the casting and ring together. By the use of the nut M and its engaging thread, I am enabled to remove the casting L' and bolt N from the cross frame F. The casting L' is also provided with a wing on each side having slots into which the edges of the bracket G enter, as illustrated in dotted lines in Fig. 1.

The lower end of the slot in the bracket G is closed by a metal strip P and held in position by two longer strips Q and Q', which are bolted on opposite sides to the bracket G as illustrated by dotted lines in Fig. 1, and the bolt R serves to hold the three strips together as will be readily understood.

It is evident that a weight placed on the platform H will rest on the springs J which will provide a resilient action, and that since one cross frame may swing relative to its supporting bracket and the other cross frame cannot swing relative to its supporting bracket, a three point bearing is secured, so that any one of the wheels may be elevated relative to the others without tilting the platform, unless the wheel is lifted to an excessive height. It is also evident that the elevation of a wheel on one side of the truck will cause the ball bearing C on the opposite side to co-act and prevent the side frame from being tilted.

The parts are practically interchangeable, the only point of difference being the difference in the diameter of bolt used on the swinging end being smaller to allow the swinging movement, whereas on the opposite end the diameter of the bolt is equal to the width of the opening in the cross frame.

The location of the springs at the center of the truck at its ends allows two springs to take the place of a greater number otherwise necessary, and allow of a very simple and durable construction of the parts.

I claim—

1. A truck having a platform, a front and rear bracket connected thereto, a cross-frame connected to each of said brackets, a pivotal bearing supported by one of said cross-frames and a spring carried by the adjacent bracket to effect a relative yielding movement of said bracket and cross-frame.

2. A truck having a platform, a front and rear bracket connected thereto, a cross-frame connected to each of said brackets, a box bearing supported by one of said cross-frames, and a spring carried by the adjacent bracket to effect a relative yielding movement of said bracket and cross-frame.

3. A truck having a platform, a front and rear bracket formed of sheet metal connected thereto, a cross-frame formed of sheet metal connected to each of said brackets, a box bearing supported by one of said cross-frames, a spring carried by the adjacent bracket to effect a relative yielding movement of said bracket and cross frame, and a guide adapted to limit the relative yielding movement.

4. A truck having a platform, a front and rear bracket connected thereto, a cross frame connected to each of said brackets, two side frames connecting each of said cross-frames and having boxes provided with annular bearings, and axles having bearing surfaces adapted to fit said annular bearings.

5. A truck having a paltform, a front and rear bracket formed of sheet metal connected thereto, a cross frame connected to each of said brackets, two side frames formed of sheet metal and connecting each of said cross-frames and having boxes connected rigidly to said side frames and provided with annular bearings, and axles having bearing surfaces adapted to fit said annular bearings.

6. A truck having a platform, a front and rear bracket formed of sheet metal connected thereto, a cross frame connected to each of said brackets, two side frames formed of sheet metal and connecting each of said cross-frames and having boxes connected rigidly to said side frames and provided with annular bearings, axles having bearing surfaces adapted to fit said annular bearings, and springs interposed between each of said cross-frames and brackets to effect a relative yielding movement.

Signed at New York in the county of New York and State of New York this 29th day of July A. D. 1909.

FRANK M. ASHLEY.

Witnesses:
 HARRY A. WILKES,
 A. T. SCHARPS.